US 6,560,204 B1

(12) United States Patent
Rayes

(10) Patent No.: US 6,560,204 B1
(45) Date of Patent: May 6, 2003

(54) METHOD OF ESTIMATING CALL LEVEL TRAFFIC INTENSITY BASED ON CHANNEL LINK MEASUREMENTS

(75) Inventor: Ammar Rayes, Bridgewater, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/260,109

(22) Filed: Mar. 2, 1999

Related U.S. Application Data
(60) Provisional application No. 60/085,348, filed on May 13, 1998.

(51) Int. Cl.$^7$ .................... G01R 31/08; G06F 11/00; G08C 15/00; H04J 1/16; H04J 3/14; H04L 1/00; H04L 12/26; H04L 12/28; H04L 12/56
(52) U.S. Cl. ................ 370/253; 370/231; 370/232; 370/235; 370/400
(58) Field of Search ................ 370/241, 252, 370/253, 229, 230, 232, 233, 234, 235, 400, 231

(56) References Cited

U.S. PATENT DOCUMENTS

| | | | | |
|---|---|---|---|---|
| 5,042,027 A | * | 8/1991 | Takase et al. | 370/252 |
| 5,848,056 A | * | 12/1998 | Meurisse et al. | 370/232 |
| 6,061,331 A | * | 5/2000 | Conway et al. | 370/232 |
| 6,115,462 A | * | 9/2000 | Servi et al. | 370/252 |

OTHER PUBLICATIONS

Amarnath et al, A New Technique for Link Utilization Estimation in Packet Data Networks using SNMP Variables. GLOBECOM '97. Nov. 3–8, 1997.*

Randhawa et al., Estimation and Prediction of VBR Traffic in High–Speed Networks using LMS Filters. IEEE International Conference on Communications. Jun., 7–11, 1998.*

Girad, A., Routing and Dimensioning in Circuit–Switched Networks, Addison Wesley Publishing Company, 1990. (Text Book–not included).

Hegde, M.V., Min, P.S. and Rayes, A., Estimation of Exogenous Traffic Based on Link Measurements in Circuit–Switched Networks, IEEE Transactions on Communications, vol. 43, No. 8, pp. 2381–2390, Aug. 1995.

Kelly, F.P., Blocking Probability in Large Circuit–Switched Networks, Advances in Applied Probability, vo. 18, pp. 473–505 1986. (Unable to obtain).

* cited by examiner

*Primary Examiner*—Seema S. Rao
*Assistant Examiner*—Kevin C. Harper
(74) *Attorney, Agent, or Firm*—David A. Hey

(57) ABSTRACT

Methods and systems are provided for estimating the source-destination traffic in a packet-switched network. Source-destination traffic is critical input to a variety of network engineering and planning functions. However, it is difficult and prohibitively expensive to directly measure source-destination traffic in a packet-switched network. Channel link measurements are more readily available for packet-switched networks. Thus, methods and systems in accordance with the present invention use channel link measurements, along with knowledge of traffic paths through the network for source-destination pairs, to estimate source-destination traffic.

8 Claims, 3 Drawing Sheets

METHOD OF ESTIMATING CALL LEVEL TRAFFIC INTENSITY BASED ON CHANNEL LINK MEASUREMENTS

CROSS-REFERENCE TO RELATED APPLICATIONS

This application refers to and claims the benefit of U.S. Provisional Application No. 60/085,348, filed May 13, 1998, the contents of which is hereby incorporated by reference.

BACKGROUND OF THE INVENTION

The present invention relates to packet-switched communications networks, and more particularly to the estimation of point-to-point traffic between sources and destinations for use in the engineering and planning of a packet-switched communications network.

Many network engineering functions, including routing, congestion control, network dimensioning, and capacity expansion, benefit from the ability to accurately estimate call-level source-to-destination traffic intensity. While the traffic intensity data need not be known instantaneously, network design and planning requires the time averaged value of such data. Based on this value, network design engineers can project future traffic levels and thus calculate capacity requirements. Engineers subsequently augment the network to satisfy a specified grade of service, such as overall blocking probability, when carrying the projected traffic load.

To properly engineer a network, engineers should conduct a performance evaluation of the network periodically with the purpose of monitoring whether the network is meeting its stated performance objectives. It may not be practical, however, to directly measure the level of end-to-end performance sustained on all paths through the network. For example, end-to-end utilization, end-to-end delay, and call-level traffic loads (e.g., point-to-point traffic) cannot be directly measured from a packet-switched network. One quantity that can be measured more easily is traffic load on each link in the network. If the relationship between link traffic and point-to-point traffic can be established, the point-to-point traffic can be estimated using link traffic measurements.

Methods have previously been developed for estimating point-to-point traffic in circuit-switched networks. Some of these methods are described in Girard, A., *Routing and Dimensioning in Circuit-Switched Networks*, Addison-Wesley Publishing Company, 1990, and Hegde, M. V., Min, P. S. and Rayes, A., "Estimation of Exogenous Traffic Based on Link Measurements in Circuit-Switched Networks," *IEEE Transactions on Communications*, Vol. 43, No. 8, pp. 2381–2390, August 1995. These methods, however, cannot be applied directly to packet-switched networks because the operation and traffic patterns of circuit-switched networks are fundamentally different from those of packet-switched networks. The problem of estimating traffic in a packet-switched network is more complex.

It is desirable, therefore, to provide a method for estimating call-level source-destination traffic intensity developed specifically for packet-switched communications networks. It is also desirable to provide a method for estimating call-level source-destination traffic intensity in a packet-switched network using quantities that can be directly measured from the network, such as traffic on each link in the network.

DESCRIPTION OF THE INVENTION

Methods and systems in accordance with the present invention satisfy those desires by estimating source-destination traffic in a packet-switched network based on measured link traffic and the assignment of traffic paths on the network to source-destination pairs.

Methods and systems consistent with the present invention estimate source-to-destination traffic in a packet-switched network by obtaining a measurement of traffic arriving on each of the links in the network, obtaining a measurement of traffic overflowing from each of the links in the network, determining a relationship between the measurements of arriving traffic on each link and the source-destination traffic based on the assignment of traffic paths through the network to source-destination pairs, and determining an estimate of source-destination traffic based on that relationship and the measurement of arriving traffic on each link. A method or system in accordance with an embodiment of the present invention determines an estimator that minimizes or maximizes certain criteria, such as a least-squares estimator or a maximum likelihood estimator.

The above desires, and other desires, features, and advantages of the present invention will be readily appreciated by one of ordinary skill in the art from the following detailed description of the preferred implementations when taken in connection with the accompanying drawings.

BEST MODE FOR CARRYING OUT THE INVENTION

Reference will now be made in detail to the presently preferred embodiments of the invention, examples of which are illustrated in the accompanying drawings. Wherever possible, the same reference numbers will be used throughout the drawings to refer to the same or like parts.

Figure 1:
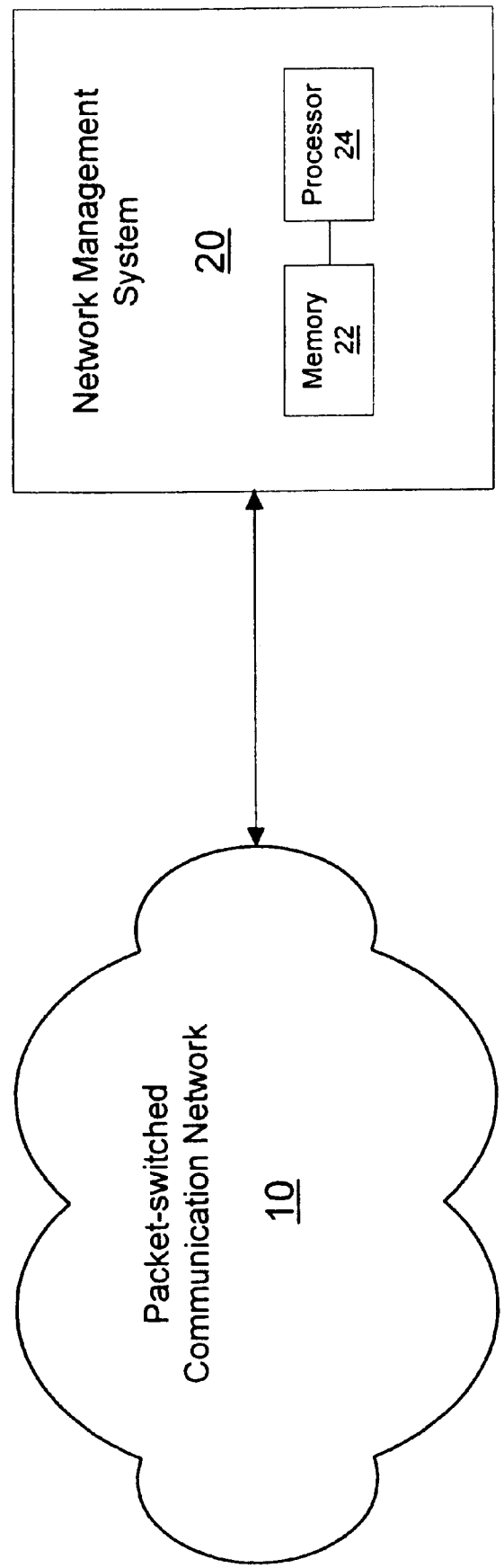
FIG. 1 is a high level diagram of a packet-switched network and network management system in which source-destination traffic estimation methods in accordance with the present invention may be implemented.

FIG. 1 illustrates a packet-switched communications network and network management system in which methods in accordance with the present invention may be implemented. In general, network management system 20 performs network management functions for packet-switched communications network 10. Network management system 20 includes processor 22 and memory 24. Methods for estimating source-destination traffic in accordance with the present invention may be stored as software in memory 24 and can be executed by processor 22. Memory 24 may be any type of computer-readable medium, such as any electronic, magnetic, or optical read/write storage device. Alternatively, if network planning and engineering functions are kept separate from the system that performs day-to-day management of the network, methods for estimating source-destination in accordance with the present invention may be stored and executed on a separate computer (not shown) that has access to network management system 20. Data used by network management functions is passed from network 10 to network management system 20. Specifically, network management system 20 may receive from network 10 network management protocol messages containing link traffic measurement data to be used in estimation methods in accordance with the present invention.

Traffic Model

Figure 2:
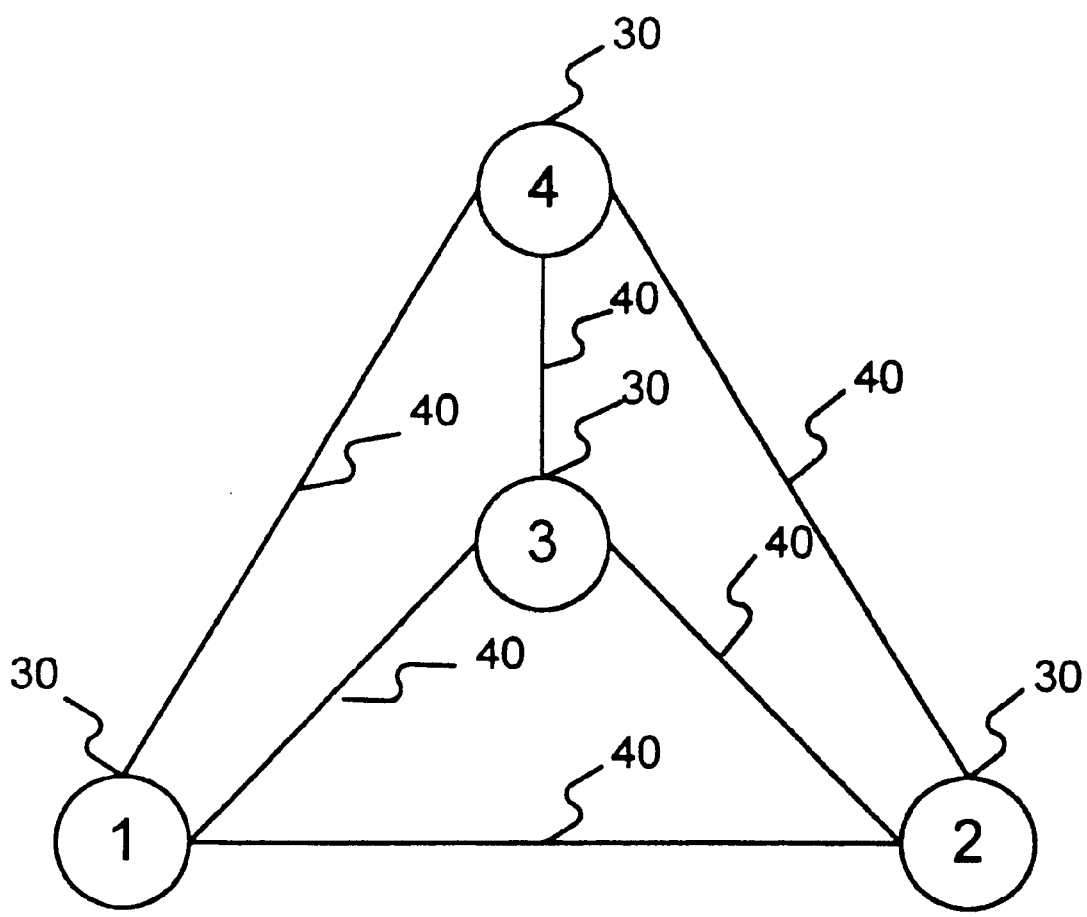
FIG. 2 illustrates nodes and links of a packet-switched network in methods in accordance with the present invention.

The following model will be used to describe estimation methods in accordance with the present invention. Packet-switched network 10 is assumed to have N nodes. Traffic is bidirectional, so the total number of origin-destination (OD) pairs is P=N (N−1)/2. For notational purposes, each OD pair is labeled by an index i, i=1, 2, . . . ,P. FIG. 2 shows an example of packet-switched network 10 with nodes 30 interconnected by links 40. This particular network has N=4 nodes and P=6 OD pairs. The OD pairs can be indexed as follows:

| OD Pair | Nodes |
| --- | --- |
| 1 | [1,2] |
| 2 | [1,3] |
| 3 | [1,4] |
| 4 | [2,3] |
| 5 | [2,3] |
| 6 | [3,4] |

Assuming sequential routing, there is a finite sequence of paths $R_i$ assigned to each OD pair i, and each $R_i$ contains at most M paths between the source and destination of the OD pair i, each path consisting of a set of links 40 between nodes 30. That is, whenever a request is made to establish a call on OD pair i, the paths in $R_i$ are examined in sequence, and the call is carried on the first path in $R_i$ with enough bandwidth to accommodate the call on all of its links. In practice, few paths in $R_i$ contain more than two links 40. When a call is connected, it utilizes a certain amount of bandwidth, depending on the call type, on every link 40 of its route. Different call types include voice calls and data calls with various bandwidth requirements, including e-mail applications and Internet calls.

The jth path in the sequence of paths $R_i$ will be referred to herein as ij, where i=1, 2, . . . , P, and j=1, 2, . . . , M. Hence, path ij is the jth choice for OD pair i. Each path ij consists of one or more links. The kth link of path ij will be referred to herein as ijk. With the assumption that each path contains at most two links, k is equal to 1 or 2. The notation ijk refers to a unique link l, where l=1, 2, . . . , L. Both the ijk and l notations will be used herein.

For each call type, each link may be in an unblocked state when it can accept calls, or in a blocked state when it cannot accept any new calls of the specified call type. The blocking probability of type z calls of link l is referred to herein as $B_l^z$ or $B_{ijk}^z$. Link blocking probabilities are assumed to be statistically independent. This assumption is valid for circuit-switched networks (see Girard, A., *Routing and Dimensioning in Circuit-Switched Networks*, Addison-Wesley Publishing Company, 1990, and Kelly, F. P., "Blocking Probabilities in Large Circuit-Switched Networks," *Advances in Applied Probability*, Vol. 18, pp. 473–505, 1986). While this assumption has not been validated for packet-switched networks, it becomes increasingly accurate with the size of the network and is necessary to develop a tractable model.

Path blocking probabilities of call type z for path ij are referred to herein as $\tilde{B}_{ij}^z$. For direct paths (i.e., paths consisting of only one link), $\tilde{B}_{ij}^z = B_{ij1}^z$. For two-link paths, $\tilde{B}_{ij}^z = B_{ij1}^z + B_{ij2}^z - B_{ij1}^z B_{ij2}^z$, which is a consequence of the assumption of statistical independence of the link blocking probabilities.

Although different call types exhibit different behavior, it is well known that all exogenous traffic, regardless of call type, enters the network as a Poisson process. Traffic corresponding to different OD pairs are independent Poisson streams. The intensity, or rate, of the traffic process corresponding to OD pair i and call type z is referred to herein as $\lambda_i^z$ calls per time unit. The $\lambda_i^z$, i=1, 2, . . . , P, are unknown and can be treated either as parameters or as random variables.

In accordance with the present invention, two measurements of traffic on link k for each call type are made during a measurement interval: $a_k^z$, the number of type z calls that arrive on link k during the measurement interval (i.e., the calls offered to the link, including calls that are carried on the link and calls that overflow to another link); and $o_k^z$, the number of calls that overflow from link k during the measurement interval. Methods in accordance with the present invention estimate the exogenous traffic rates $\lambda_i^z$ based on the observed measurements $a_k^z$ and $o_k^z$ and knowledge of the routing sequences $R_i$, i=1, 2, . . . , P. In accordance with an embodiment of the present invention, the estimates are based on a single measurement interval to keep computational requirements low.

The relationship between the traffic intensities $\lambda_i^z$ and the observed link measurements ($a_k^z$, $o_k^z$) is determined as follows. The number of calls $a_k^z$ that arrive on link k could have originated from many OD pair traffic streams. However, there are only certain possible realizations, $n_i^z$, i=1, 2, . . . , P, of the actual number of arrived calls in Poisson stream i (calls corresponding to OD pair i) that are compatible with the observations ($a_k^z$, $o_k^z$), k=1, 2, . . . , L. If the $n_i^z$ are known precisely, they can be used to estimate the traffic intensities $\lambda_i^z$. For example, the maximum likelihood estimator for $\lambda_i^z$ would be $n_i^z/t$, where t is the measurement interval. Thus, $\lambda_i^z$ can be estimated by first estimating $n_i^z$.

The proportion of calls of type z offered between OD pair i and blocked in path ij is denoted herein as $r_{ij}^z$, i=1, 2, . . . , P, j=1, 2, . . . , M. Link sets $W_k(m)$, k=1, 2, . . . , L, m=1, 2, . . . , M, are defined such that $$W_k(m) = \{i | \text{link } k \text{ is part of the } m\text{th path for OD pair } i\}.$$

Assuming that $i \in W_k$ for some m, the fractional contribution to the measurement $a_k^z$ that originates from Poisson stream i is equal to $$\prod_{t=1}^{m-1} \tilde{B}_{it}^z,$$

where the null product is defined as unity. Further, the matrix expressing the fractional relationship between the mean of the traffic offered to each link and the mean of exogenous traffic is denoted herein as $$H^z = [h_{ki}^z] \in R^{L \times P}.$$

Each element $h_{ki}^z$ represents the fractional relationship between the measured (offered) traffic $a_k^z$ on link k and the exogenous Poisson traffic between OD pair i during a measurement interval. Thus, $$h_{ki}^z = \begin{cases} \prod_{t=1}^{m-1} \tilde{B}_{it}^z & \text{if } i \in W_k(m) \text{ for some } m \\ 0 & \text{otherwise.} \end{cases} \quad (1)$$

Then the observation $a_k^z$ during a measurement interval is the realization of a Poisson random variable with mean $t(H^z\Lambda^z)_k$ where $(H^z\Lambda^z)_k$ is the kth element of the column vector $H^z\Lambda^z$ and $$\Lambda^z = (\lambda_1^z, \lambda_2^z, \ldots, \lambda_p^z)^T.$$

Thus, $a_k^z$ can be written as $t(H^z\Lambda^z)_k + \delta_k$, where $\delta_k$ is a random variable such that $t(H^z\Lambda^z)_k + \delta_k$ is a Poisson random variable with mean $t(H^z\Lambda^z)_k$. In matrix form, $$A^z = tH^z\Lambda^z + \Delta \quad (2)$$

where $$A^z = (a_1^z, a_2^z, \ldots, a_L^z)^T \text{ and}$$
$$\Delta = (\delta_1, \delta_2, \ldots, \delta_L)^T.$$

In equation (2), $A^z$ and $H^z$ are random quantities whose values are observed. $A^z$ is the vector of observed measurements of calls arriving on each link during the measurement interval. $H^z$ is computed from the observed values $a_k^z$ and $o_k^z$ and knowledge of the routing sequences as follows. $H^z$ is the matrix whose elements, given in equation (1), are based on the path blocking probabilities $\tilde{B}_{ij}^z$, which can be written in terms of the link blocking probabilities $B_l^z$, which are statistically independent. Each link blocking probability $B_l^z$ can be calculated from the measured number of arrived calls and overflow calls on link l:

$$B_l^z = \frac{o_l^z}{a_l^z}$$

$\Lambda^z$ is the unknown vector to be estimated, and $\Delta$ is a vector of slack variables which are added to guarantee the existence of a non-negative solution of the exogenous traffic intensity $\Lambda^z$.

Thus, equation (2) provides the desired relationship between the link measurements and the point-to-point traffic to be estimated. If dynamic routing is assumed instead of sequential routing, equation (2) still provides the relationship between link measurements and point-to-point traffic to be estimated. The computation of $H^z$ from the observed values $a_k^z$ and $o_k^z$ is different because it reflects the properties of dynamic routing instead of sequential routing.

Because the relationship in equation (2) has more unknowns than equations, there are an infinite number of solutions for the values of the vector $\Lambda^z$. In order to solve for the unknown call-level traffic intensity values, methods in accordance with the present invention determine an estimator of the exogenous traffic intensity $\Lambda^z$ such that the resulting estimator minimizes or maximizes a certain criterion with respect to equation (2). Examples of such estimators will be described below.

Figure 3:
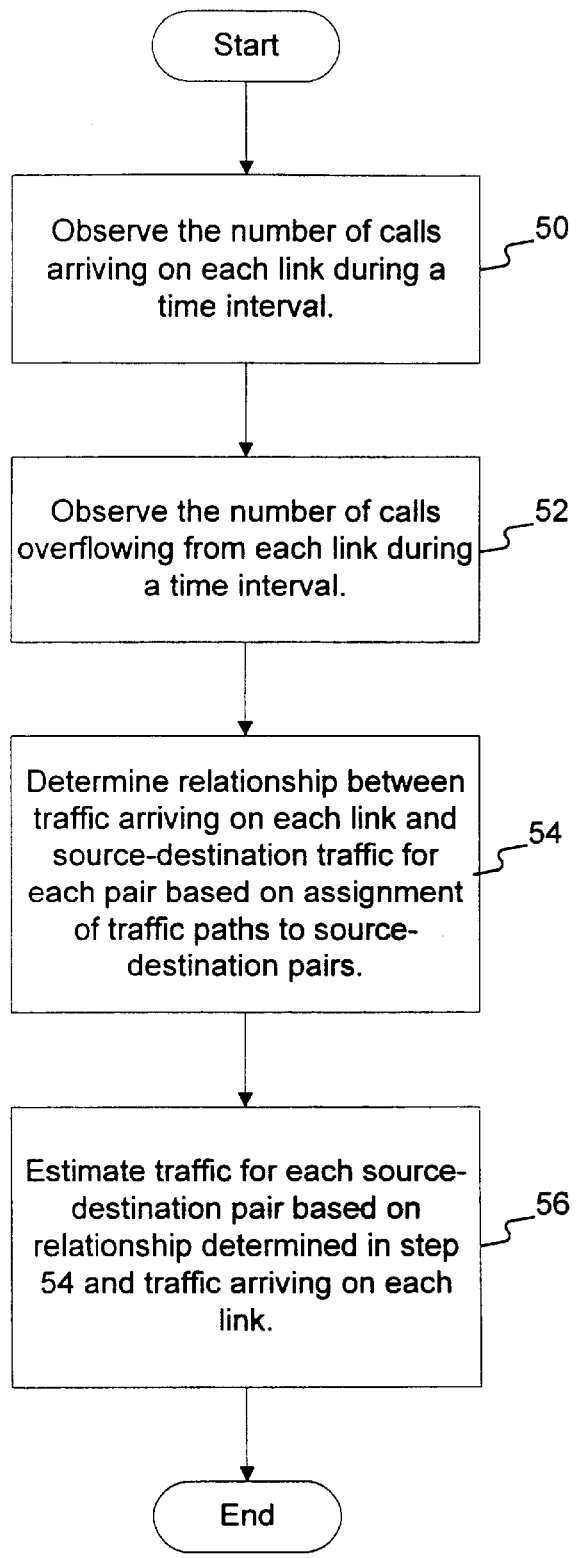
FIG. 3 is a flow diagram of a method for estimating source-destination traffic in accordance with an embodiment of the present invention.

FIG. 3 is a flow diagram of the steps a network management system preferably performs to estimate source-destination traffic in accordance the present invention. First, network management system 20 observes the number of calls $a_k^z$ that arrive on each link during a time interval of length t (step 50). Network management system 20 also observes the number of calls $o_k^z$ that overflow from each link during the time interval (step 52). Both $a_k^z$ and $o_k^z$ are measurements commonly made by network management systems for packet-switched networks such as ATM networks.

Next, in accordance with an embodiment of the present invention, network management system 20 determines the relationship between the arriving traffic measured on each link and the traffic for each source-destination pair based on the assignment of traffic paths to the source-destination pairs (step 54). For example, in the case of sequential routing, this relationship is given by equation (1). Alternatively, step 54 may be performed by a computer separate from network management system 20, e.g., if network planning functions are performed separately from the day-to-day management of the network. In this case, the separate computer must receive the traffic measurements made in steps 50 and 52 from network management system 20.

Finally, the traffic rate for each source-destination pair is estimated based on the relationship determined in step 54 and the measurement of the traffic arriving on each link (step 56). Methods consistent with embodiments of the present invention perform step 56 by determining an estimator that minimizes or maximizes a certain criterion with respect to equation (2). Examples of such estimators will now be presented.

Least Squares Estimation

A method consistent with one embodiment of the present invention estimates $\Lambda^z$ using a least-squares estimator, known in the art and described in, e.g., Poor, H. V., *Introduction to Signal Detection and Estimation*, Springer-Verlage, 1988; Van Trees, H. L., *Detection, Estimation, and Modulation Theory, Part I*, John Wiley & Sons, 1968. The least-squares estimator of $\Lambda^z$, denoted, $\hat{\Lambda}_{ls}^z$ yields an estimated value of $\Lambda^z$ such that the squared distance between the estimator and the measured observations is minimized. Thus, $\hat{\Lambda}_{ls}^z$ may be defined by $$\hat{\Lambda}_{ls}^z = \text{Argmin}_{\Lambda^z} (tH^z\Lambda^z - A^z)^T (tH^z\Lambda^z - A^z) \quad (3)$$

The least squares estimation method determines the $P=N(N-1)/2$ unknowns constituting $\Lambda^z$ such that $tH^z \Lambda^z$ has the minimum squared distance to the L data points of $A^z$. For any network without full connectivity, L is strictly less than P. Thus, there may exist many estimators $\hat{\Lambda}_{ls}^z$ that satisfy $$(tH^z\Lambda^z - A^z)^T(tH^z\Lambda^z - A^z) = 0.$$

That is, given any estimator $\hat{\Lambda}_{ls}^z$, the addition of a vector in $N_{H^z}$, the null space of $H^z$, yields an equally valid estimator $\hat{\Lambda}_{ls}^z$ if the resulting $\hat{\Lambda}_{ls}^z$ is non-negative.

To deal with the non-uniqueness of the solution, one author has suggested assigning $$\hat{\Lambda}_{ls}^z = \frac{1}{t}(H^z)^{-R} A^z$$

where $(H^z)^{-R}$ is the right inverse of $H^z$ such that $(H^z)(H^z)^{-R} = I$ (see Tu, M., "Estimation of Point-to-Point Traffic Loads Based on Network Measurements," *Proceedings of the 13th International Teletraffic Congress*, Copenhagen, June 1991. Hence, $$\hat{\Lambda}_{ls}^z = \frac{1}{t}(H^z)^{-R} A^z = \frac{1}{t}(H^z)^T [H^z(H^z)^T]^{-1} A^z. \quad (4)$$

This solution corresponds to the minimum energy condition (i.e., the solution spreads the magnitude of $\hat{\Lambda}_{ls}^z$ as evenly as possible). This approach, however, may violate the required condition that $\hat{\Lambda}_{ls}^z \geq 0$.

A least-squares estimation method consistent with an embodiment of the present invention solves the following constrained minimization problem so that solutions are non-negative:

Minimize $\Delta^T \Delta$ subject to $A^z = tH^z \Lambda^z + \Delta$, $\Lambda^z \geq 0$. (5)

Since there may be many solutions that satisfy equation (5), a least-squares estimation method consistent with an embodiment of the present invention begins the minimization process with an initial point $\Lambda_e^z$, which is known a priori to be close to the correct value of $\Lambda^z$. For example, $\Lambda_e^z$ may be the average of the exogenous call-level intensity obtained from actual billing data.

Maximum Likelihood Estimation

A method consistent with another embodiment of the present invention estimates $\Lambda^z$ using a maximum likelihood estimator, known in the art and described in, e.g., the Poor and Van Trees references cited above. The maximum likelihood estimator of $\Lambda^z$, denoted $\hat{\Lambda}_{ml}^z$, is the value of $\Lambda^z$ that maximizes the likelihood of observing the $A^z$ actually observed. Thus, $\hat{\Lambda}_{ml}^z$ satisfies $$\hat{\Lambda}_{ls}^z = \text{Argmax}_{\Lambda^z} P_{A^z|\Lambda^z}(A^z|\Lambda^z). \quad (6)$$

Since the arrival processes on links are assumed to be independent, $$P_{A^z|\Lambda^z}(A^z|\Lambda^z) = \prod_{k=1}^{L} P_{a_k^z|\Lambda^z}(a_k|\Lambda^z) \quad (7)$$

$$= \prod_{k=1}^{L} \frac{t[H^z \Lambda]_k a_k^z e^{-t[H^z \Lambda^z]_k}}{a_k^z!}$$

$[H^z \Lambda^z]_k$ corresponds to the kth element of the vector $H^z \Lambda^z$, i.e., $$[H^z \Lambda^z]_k = \sum_{j=1}^{P} h_{kj}^z \lambda_j^z.$$

Applying the natural logarithm, which is monotonic in its argument, and eliminating the constant denominator from $P_{A^z|\Lambda^z}(A^z|\Lambda^z)$, the function to be maximized can be written as $$O(\Lambda^z) = \sum_{k=1}^{L} a_k^z \ln(t[H^z \Lambda^z]_k) - t[H^z \Lambda^z]_k. \quad (8)$$

Since every variable in equation (8) is non-negative, the second derivative is non-negative, and thus $P_{A^z|\Lambda^z}(A^z|\Lambda^z)$ has a unique global maximum. Therefore, the maximum likelihood estimator $\hat{\Lambda}_{ml}^z$ is the solution to $$\text{Maximize} \sum_{k=1}^{L} a_k^z \ln(t[H^z \Lambda^z]_k) - t[H^z \Lambda^z]_k \quad (9)$$

subject to $\Lambda^z \geq 0$.

Solving equation (9) is a convex programming problem, and a nonlinear optimization method can be used with an initial value of $\Lambda_e^z$, representing the a priori knowledge of $\Lambda^z$, e.g., traffic intensity recorded as billing data.

Community of Interest Estimation

In telephony practice, statistical information about the exogenous traffic intensity, known as Community of Interest Factors (CIF), is readily available and widely used for planning purposes. The CIF consists of normalized ratios among the $\lambda_i^z$. For example, CIF can be written as $$k_i^z = \frac{\overline{\lambda}_i^z}{\sqrt{\sum_{i=1}^{P} (\overline{\lambda}_i^z)^2}} \quad (10)$$

where $\overline{\lambda}_i^z$ is the average value of $\lambda_i^z$ recorded (e.g., as billing data) over a long period of time (e.g., six months). The CIF vector consists of all $k_i^z$'s, i.e., $K^z = (k_1^z, k_2^z, \ldots, k_p^z)$.

The CIF is useful because, while $\lambda_i^z$ changes instantaneously over time, the relative magnitudes among the $\lambda_i^z$ remain much more stable. It is a common practice in telephony to forecast future traffic based on the assumption that the CIF remains constant over a finite time. The CIF can be calculated easily from recorded call usage during the recent past and represents assumptions normally made in telephony about the variation in relative exogenous traffic intensities.

A method consistent with yet another embodiment of the present invention estimates $\Lambda^z$ using the CIF vector $K^z$. An estimator should maintain the ratios of the estimated exogenous intensities close to that in the CIF vector $K^z$. One way to achieve this is to minimize the angle between the estimator, denoted as $\Lambda_{CIF}^z$, and the CIF vector $K^z$. The angle between $\Lambda_{CIF}^z$ and $K^z$ is defined as $$\cos^{-1}\left(\frac{\Lambda^z \cdot K^z}{\|\Lambda^z\|}\right) \quad (11)$$

where "·" is the dot product between two vectors.

The angle in equation (11) is minimized by finding the value $\hat{\Lambda}_{CIF}^z$ that solves the following:

$$\text{Maximize} \frac{\Lambda^z \cdot K^z}{\|\Lambda^z\|} \quad (12)$$

subject to $A^z = tH^z \Lambda^z$, $\Lambda^z \geq 0$.

Equation (12) does not guarantee the existence of $\hat{\Lambda}_{CIF}^z$. However, by eliminating the non-negativity constraint for $\Lambda^z$ in equation (12), the existence of a solution is guaranteed and the solution is unique. To ensure a non-negative solution, the optimization problem to be solved can be written as:

$$\text{Maximize } w_1\left(\frac{\Lambda^z \cdot K^z}{\|\Lambda^z\|}\right) - w_2 \Delta^T \Delta \quad (13)$$

subject to $A^z = tH^z \Lambda^z + \Delta$ $\Lambda^z \geq 0$.

The inclusion of slack variables $\Delta$ is necessary to guarantee the existence of a solution without the non-negativity constraint. The constants $w_1$ and $w_2$ are positive weighting factors to keep the contribution from the slack variables small. As with the other estimation methods, the maximization process can begin with an initial point $\Lambda_e^z$ based on a priori knowledge of traffic intensity.

As described with respect to equations (5), (9), and (13), determining an estimator in accordance with embodiments of the present invention may require solving a constrained quadratic or nonlinear optimization problem. Optimization software such as the Optimization Tool Box available in MATLAB may be used to solve such problems. Alternatively, more specialized optimization software could be developed to solve the optimization problems.

It will be apparent to those skilled in this art that various modifications and variations can be made to the estimation and forecasting scheme of the present invention without departing from the spirit and scope of the invention. For example, methods according to the present invention can be used to estimate and forecast the size of any large computer network in which the number of potential network addresses is known. Also, other parameter estimation methods in addition to the maximum log-likelihood and minimum chi-square methods may be used. Other embodiments of the invention will be apparent to those skilled in this art from consideration of the specification and practice of the invention disclosed herein. It is intended that the specification and examples be considered exemplary only, with the true scope and spirit of the invention being indicated by the following claims.

What is claimed is:

1. A method for estimating source-destination traffic for a packet-switched communications network, wherein the network includes a plurality of nodes interconnected by a plurality of links, and wherein the network includes a plurality of source-destination node pairs, wherein each source-destination pair is assigned at least one traffic path between the source node of the pair and the destination node of the pair, each traffic path including at least one link, the method comprising the steps of:

obtaining a measurement of traffic arriving on each of the plurality of links;

obtaining a measurement of traffic overflowing from each of the plurality of links;

determining a relationship between the measurement of traffic arriving on each of the plurality of links and a traffic rate for each source-destination pair based on the assignment of traffic paths to the plurality of source-destination pairs and the measurements of traffic arriving on and overflowing from each of the plurality of links; and determining an estimate of the traffic rate for each of the plurality of source-destination pairs based on the measurement of traffic arriving on each of the plurality of links and the determined relationship between the measurement of traffic arriving on each of the plurality of links and the traffic rate for each source-destination pair.

2. The method of claim 1 wherein the step of determining an estimate includes determining a least squares estimator for the call level traffic rate.

3. The method of claim I wherein the step of determining an estimate includes determining a maximum likelihood estimator for the call level traffic rate.

4. The method of claim 1 wherein the step of determining an estimate includes minimizing an angle between a vector of the estimated call level traffic rates for the plurality of source-destination pairs and a vector of desired traffic ratios among the plurality of source-destination pairs.

5. The method of claim 1 wherein the step of determining an estimate includes the substep of using an initial estimate of a call level traffic rate for each of the plurality of source-destination pairs.

6. The method of claim 5 wherein the initial estimate is based on traffic data recorded by the network.

7. A computer-readable medium containing instructions for estimating source-destination traffic in a packet-switched communications network, wherein the network includes a plurality of nodes interconnected by a plurality of links, and wherein the network includes a plurality of source-destination node pairs, wherein each source-destination pair is assigned at least one traffic path between the source node of the pair and the destination node of the pair, each traffic path including at least one link, by:

obtaining a measurement of traffic arriving on each of the plurality of links;

obtaining a measurement of traffic overflowing from each of the plurality of links;

determining a relationship between the measurement of traffic arriving on each of the plurality of links and a traffic rate for each source-destination pair based on the assignment of traffic paths to the plurality of source-destination pairs and the measurements of traffic arriving on and overflowing from each of the plurality of links; and determining an estimate of the traffic rate for each of the plurality of source-destination pairs based on the measurement of traffic arriving on each of the plurality of links and the determined relationship between the measurement of traffic arriving on each of the plurality of links and the traffic rate for each source-destination pair.

8. A system for estimating source-destination traffic in a packet-switched communications network, wherein the network includes a plurality of nodes interconnected by a plurality of links, and wherein the network includes a plurality of source-destination node pairs, wherein each source-destination pair is assigned at least one traffic path between the source node of the pair and the destination node of the pair, each traffic path including at least one link, the system comprising:

means for obtaining a measurement of traffic arriving on each of the plurality of links;

means for obtaining a measurement of traffic overflowing from each of the plurality of links;

a memory comprising a traffic estimation program; and a processor utilizing the traffic estimation program to
   determine a relationship between the measurement of traffic arriving on each of the plurality of links and a traffic rate for each source-destination pair based on the assignment of traffic paths to the plurality of source-destination pairs and the measurements of traffic arriving on and overflowing from each of the plurality of links; and determine an estimate of the traffic rate for each of the plurality of source-destination pairs based on the measurement of traffic arriving on each of the plurality of links and the determined relationship between the measurement of traffic arriving on each of the plurality of links and the traffic rate for each source-destination pair.

* * * * *